(12) United States Patent
Wu

(10) Patent No.: US 10,687,365 B2
(45) Date of Patent: Jun. 16, 2020

(54) DEVICE AND METHOD OF HANDLING BANDWIDTH PARTS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 106 days.

(21) Appl. No.: 16/049,723

(22) Filed: Jul. 30, 2018

(65) Prior Publication Data

US 2019/0045549 A1     Feb. 7, 2019

Related U.S. Application Data

(60) Provisional application No. 62/540,045, filed on Aug. 1, 2017.

(51) Int. Cl.
*H04W 74/08* (2009.01)
*H04W 76/27* (2018.01)
(Continued)

(52) U.S. Cl.
CPC ... *H04W 74/0833* (2013.01); *H04W 36/0055* (2013.01); *H04W 72/042* (2013.01); *H04W 72/085* (2013.01); *H04W 76/27* (2018.02); *H04W 36/0077* (2013.01); *H04W 36/06* (2013.01); *H04W 88/08* (2013.01)

(58) Field of Classification Search
None
See application file for complete search history.

(56) References Cited

U.S. PATENT DOCUMENTS

| 10,477,457 B2 * | 11/2019 | Park | H04L 5/0053 |
| 2007/0287459 A1 * | 12/2007 | Diachina | H04W 36/0066 |
| | | | 455/436 |

(Continued)

FOREIGN PATENT DOCUMENTS

WO   WO-2018232284 A1 * 12/2018 .......... H04W 72/042

OTHER PUBLICATIONS

Nokia et al.: "On wider band aspects of NR", 3GPP TSG-RAN WGI Meeting NR#2 R1-1710883, Jun. 30, 2017 (Jun. 30, 2017), pp. 1-4, XP051300085 (Year: 2017).*

(Continued)

*Primary Examiner* — Ayaz R Sheikh
*Assistant Examiner* — Tarell A Hampton
(74) *Attorney, Agent, or Firm* — Winston Hsu

(57) ABSTRACT

A base station (BS) for handling bandwidth parts (BWPs) comprises at least one storage device storing instructions of communicating with a communication device via a first DL BWP and a first UL BWP in a cell; transmitting a radio resource control (RRC) message in the first DL BWP to the communication device, wherein the RRC message configures at least one of a second DL BWP and a second UL BWP in the cell to the communication device; receiving a RRC response message from the communication device in the first UL BWP; receiving a RA preamble from the communication device in the first UL BWP or the second UL BWP; transmitting a RA response (RAR) to the communication device in the first DL BWP or the second DL BWP; and communicating with the communication device via the at least one of the second DL BWP and the second UL BWP.

12 Claims, 5 Drawing Sheets

(51) Int. Cl.
*H04W 72/04* (2009.01)
*H04W 72/08* (2009.01)
*H04W 36/00* (2009.01)
*H04W 88/08* (2009.01)
*H04W 36/06* (2009.01)

(56) References Cited

U.S. PATENT DOCUMENTS

| | | | | |
|---|---|---|---|---|
| 2010/0111067 | A1* | 5/2010 | Wu | H04W 74/008 370/345 |
| 2012/0106472 | A1* | 5/2012 | Rosa | H04W 72/0453 370/329 |
| 2012/0302239 | A1* | 11/2012 | Hu | H04W 36/0022 455/436 |
| 2013/0215772 | A1* | 8/2013 | Kaur | H04W 36/0072 370/252 |
| 2014/0023054 | A1* | 1/2014 | Yang | H04W 56/0045 370/336 |
| 2018/0070369 | A1* | 3/2018 | Papasakellariou | H04L 5/0094 |
| 2018/0098361 | A1* | 4/2018 | Ji | H04L 45/00 |
| 2018/0183551 | A1* | 6/2018 | Chou | H04W 72/042 |
| 2018/0191474 | A1* | 7/2018 | Sun | H04W 72/0453 |
| 2018/0278454 | A1* | 9/2018 | Islam | H04L 1/0038 |
| 2018/0279289 | A1* | 9/2018 | Islam | H04L 5/0094 |
| 2018/0279310 | A1* | 9/2018 | Chen | H04W 72/0453 |
| 2018/0288746 | A1* | 10/2018 | Zhang | H04L 1/0031 |
| 2018/0323922 | A1* | 11/2018 | Lindoff | H04W 56/001 |
| 2018/0332505 | A1* | 11/2018 | Kim | H04L 5/0064 |
| 2018/0343154 | A1* | 11/2018 | Park | H04L 27/2613 |
| 2018/0368112 | A1* | 12/2018 | Sebeni | H04W 72/042 |
| 2019/0007124 | A1* | 1/2019 | Seo | H04B 7/15557 |
| 2019/0014556 | A1* | 1/2019 | Wu | H04L 1/1822 |
| 2019/0021045 | A1* | 1/2019 | Kim | H04W 72/042 |
| 2019/0036665 | A1* | 1/2019 | Park | H04L 5/0051 |
| 2019/0059112 | A1* | 2/2019 | Ou | H04W 74/0833 |
| 2019/0296877 | A1* | 9/2019 | Zhang | H04W 72/042 |
| 2019/0342782 | A1* | 11/2019 | Yum | H04W 72/0413 |

OTHER PUBLICATIONS

Search Report dated Oct. 30, 2018 for EP application No. 18186719. 3, pp. 1-5.
Huawei, HiSilicon, "RACH-less Handover for Mobility Enhancement", 3GPP TSG-RAN WG2 Meeting #93bis, R2-162410, Apr. 11-15, 2016, Dubrovnik, Croatia, XP051082401, pp. 1-3.
Huawei, HiSilicon, "Baseline handover procedure for inter gNB handover in NR", 3GPP TSG-RAN WG2 Adhoc#2 on NR, R2-1706705, Jun. 27-29, 2017, Qingdao, China, XP051301205, pp. 1-7.
Huawei, HiSilicon, "Allocation of appropriate RACH resources for handover", 3GPP TSG-RAN WG2 Adhoc#2 on NR, R2-1706714, Jun. 27-29, 2017, Qingdao, China, XP051301214, pp. 1-6.
Samsung, "RAN2 consideration for bandwidth part in NR", 3GPP TSG-RAN WG2 NR Ad-hoc#2 Meeting, R2-1706427 (Update of R2-1704503), Jun. 27-29, 2017, Qingdao, China, XP051300933, pp. 1-5.

* cited by examiner

DEVICE AND METHOD OF HANDLING BANDWIDTH PARTS

CROSS REFERENCE TO RELATED APPLICATIONS

This application claims the benefits of U.S. Provisional Application No. 62/540,045 filed on Aug. 1, 2017, which is incorporated herein by reference.

BACKGROUND OF THE INVENTION

1. Field of the Invention

The present invention relates to a device and a method used in a wireless communication system, and more particularly, to a device and a method of handling bandwidth parts (BWPs).

2. Description of the Prior Art

A new radio (NR) system, developed recently in the 3rd generation partnership project (3GPP), is regarded as a NR interface and radio network architecture that provides a high data rate, a low latency, a packet optimization, and an improved system capacity and coverage.

SUMMARY OF THE INVENTION

The present invention therefore provides a communication device and method for handling bandwidth parts (BWPs) to solve the abovementioned problem.

A base station (BS) for handling BWPs comprises at least one storage device; and at least one processing circuit, coupled to the at least one storage device, wherein the at least one storage device stores, and the at least one processing circuit is configured to execute instructions of communicating with a communication device via a first downlink (DL) BWP and a first uplink (UL) BWP in a cell belonging to the BS; transmitting a radio resource control (RRC) message in the first DL BWP to the communication device, wherein the RRC message configures at least one of a second DL BWP and a second UL BWP in the cell to the communication device, comprises a first random access channel (RACH) configuration configuring at least one first RACH resource for the communication device to perform a random access (RA) in the first UL BWP or the second UL BWP, and configures a first association configuration associating the at least one first RACH resource to a synchronization signal block (SSB) or a channel state information reference signal (CSI-RS) transmitted in the second DL BWP; receiving a RRC response message responding to the RRC message from the communication device in the first UL BWP; receiving a RA preamble from the communication device in the first UL BWP or the second UL BWP according to the at least one first RACH resource; transmitting a RA response (RAR) to the communication device in the first DL BWP or the second DL BWP in response to the RA preamble; and communicating with the communication device via the at least one of the second DL BWP and the second UL BWP.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
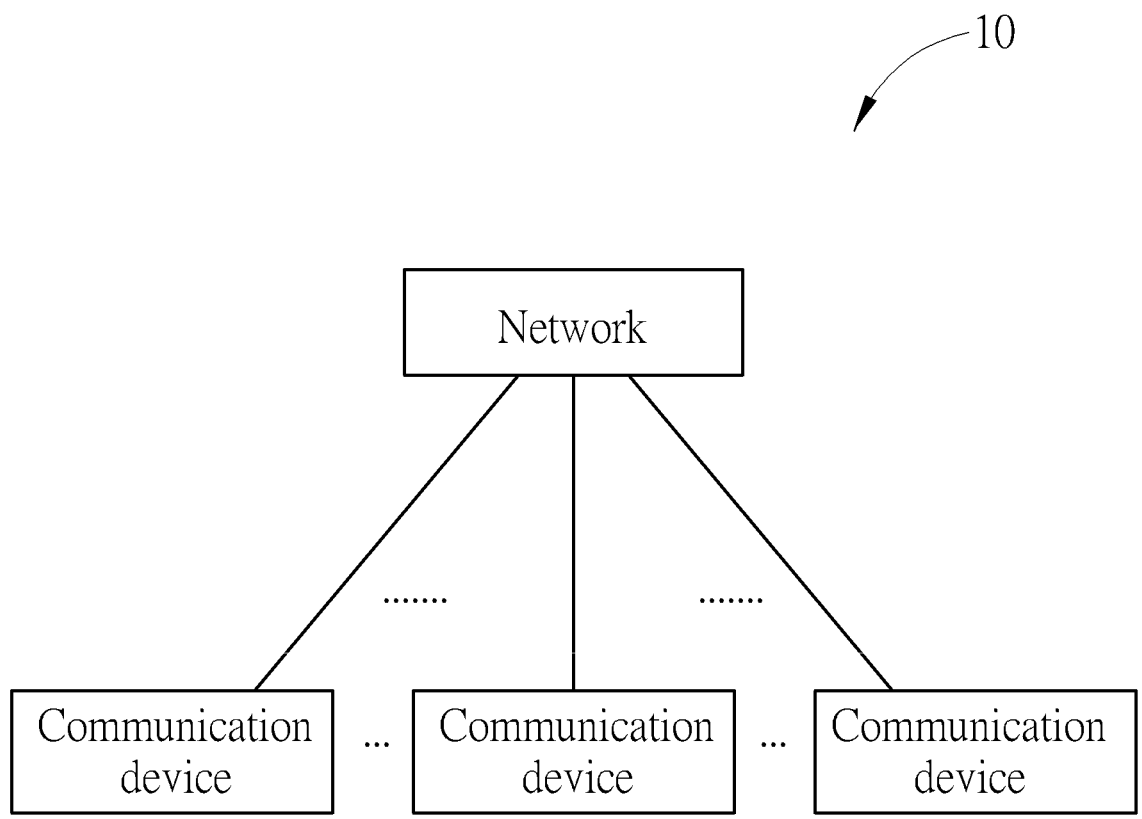
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., multiple carriers) belonging to one or multiple base stations (BSs). The abovementioned cells may be operated in the same or different duplexing modes, i.e., frequency-division duplexing (FDD), time-division duplexing (TDD) or flexible duplexing.

In FIG. 1, the network and the communication devices are simply utilized for illustrating the structure of the wireless communication system 10. The network may include a radio access network (RAN) and a core network (CN). The RAN may include at least one base station. The RAN may comprise a new radio (NR) RAN (or called a fifth generation (5G) RAN or next generation (NG) RAN), evolved NR RAN or a sixth generation (6G) RAN. The CN may be a 5G core (5GC) network, an evolved 5GC network or 6G core network.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
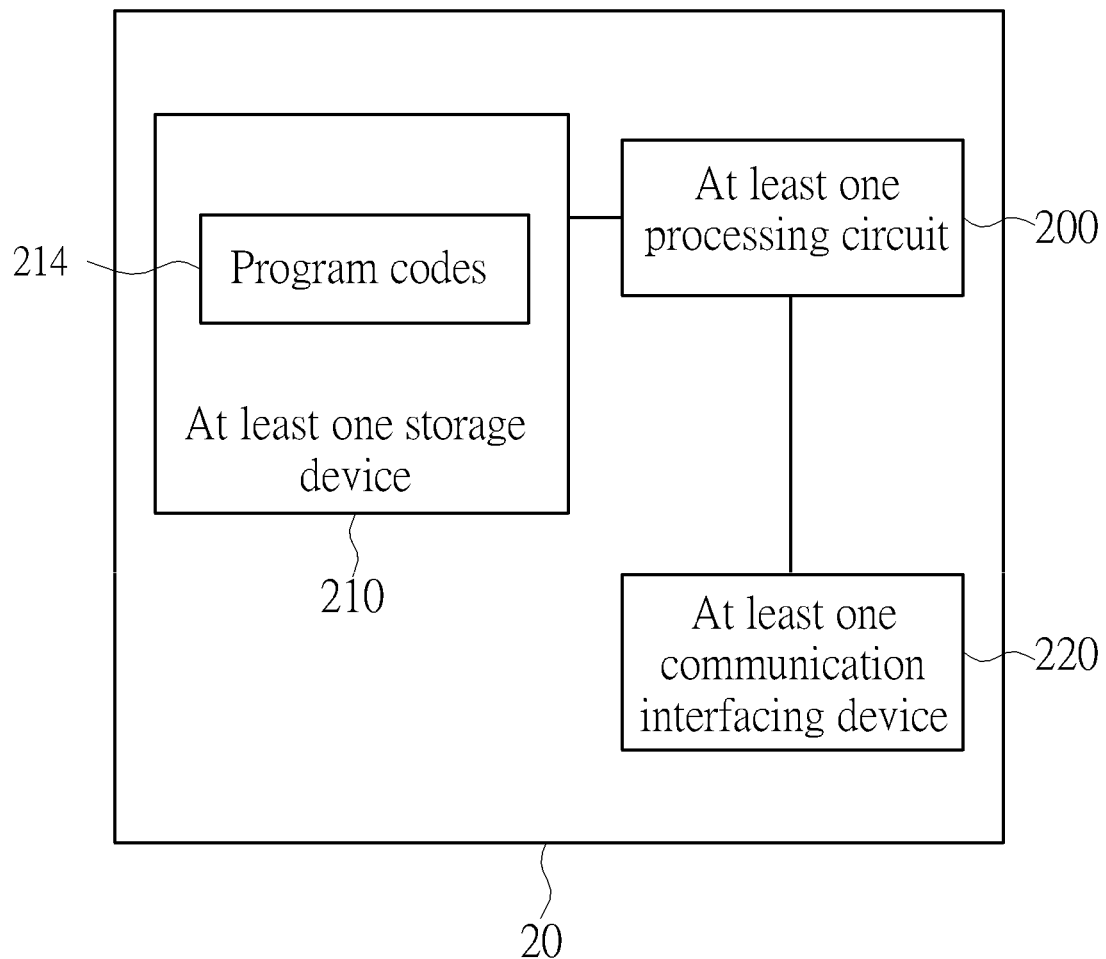
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used to represent a communication device in FIG. 1, to simplify the illustration of the examples.

Figure 3:
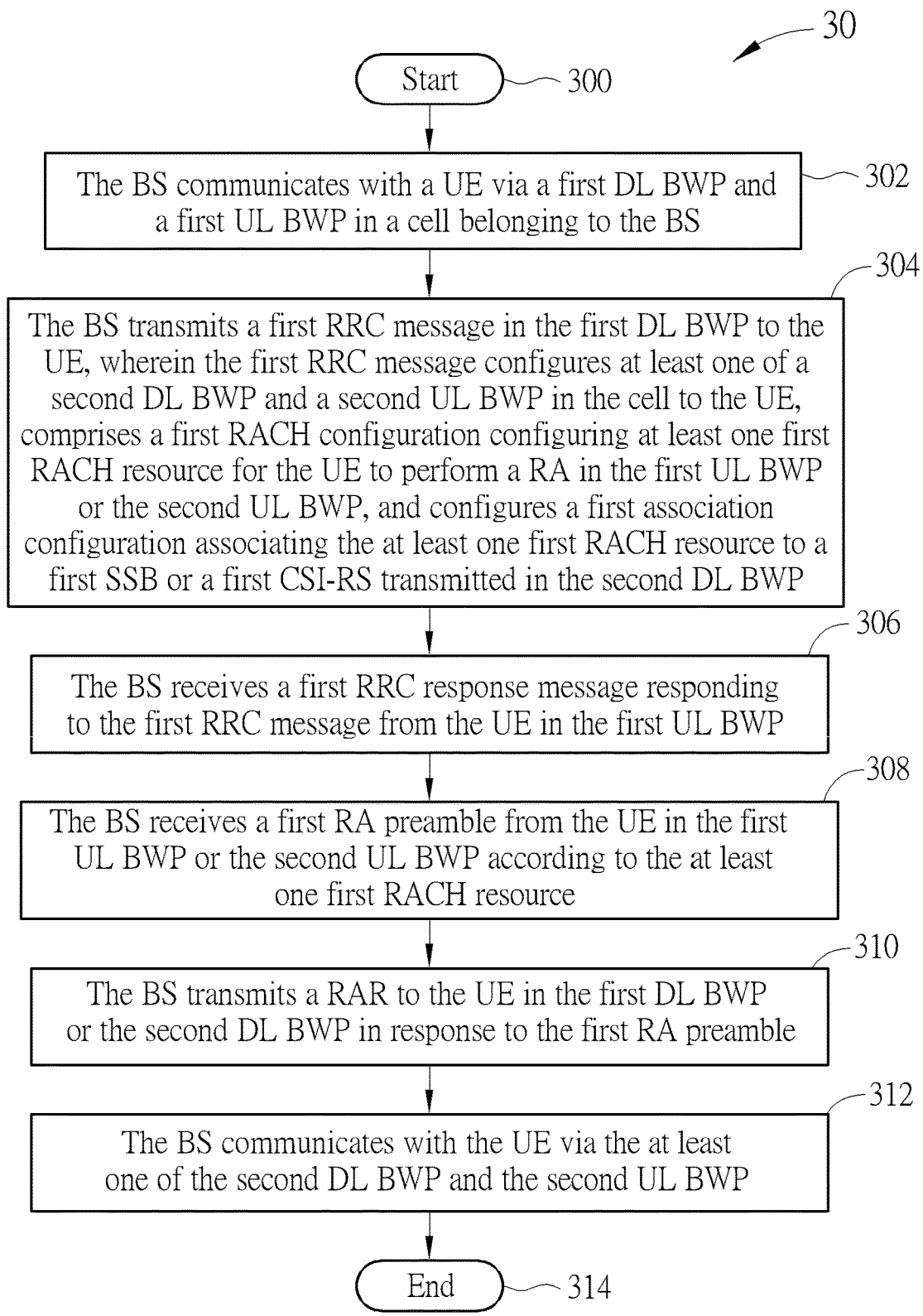
FIG. 3 is a flowchart of a process according to an example of the present invention.

A process 30 in FIG. 3 is utilized in a BS in a network shown in FIG. 1, and includes the following steps:

Step 300: Start.

Step 302: The BS communicates with a UE via a first DL BWP and a first UL BWP in a cell belonging to the BS.

Step 304: The BS transmits a first radio resource control (RRC) message in the first DL BWP to the UE, wherein the first RRC message configures at least one of a second DL BWP and a second UL BWP in the cell to the UE, comprises a first random access channel (RACH) configuration configuring at least one first RACH resource for the UE to perform a random access (RA) in the first UL BWP or the second UL BWP, and configures a first association configuration associating the at least one first RACH resource to a first synchronization signal block (SSB) or a first channel state information reference signal (CSI-RS) transmitted in the second DL BWP.

Step 306: The BS receives a first RRC response message responding to the first RRC message from the UE in the first UL BWP.

Step 308: The BS receives a first RA preamble from the UE in the first UL BWP or the second UL BWP according to the at least one first RACH resource.

Step 310: The BS transmits a RA response (RAR) to the UE in the first DL BWP or the second DL BWP in response to the first RA preamble.

Step 312: The BS communicates with the UE via the at least one of the second DL BWP and the second UL BWP.

Step 314: End.

In one example, the first DL BWP, the first UL BWP, the second DL BWP and the second UL BWP belong to the cell or a carrier identified by an absolute radio-frequency channel number (ARFCN). In one example, the first DL BWP and the first UL BWP are completely overlapped, partially overlapped or non-overlapped in a frequency domain. In the case of the first DL BWP and the first UL BWP completely overlapped, the first DL BWP includes the first UL BWP. In one example, the second DL BWP and the second UL BWP are completely overlapped, partially overlapped or non-overlapped in the frequency domain. In the case of the second DL BWP and the second UL BWP completely overlapped, the second DL BWP includes the second UL BWP.

In one example, in response to the first RRC message, the UE transmits the first RA preamble in (or on) the at least one first RACH resource in the first UL BWP or the second UL BWP, when the UE receives the first SSB or the first CSI-RS.

In one example, the BS determines to use at least one transmit (Tx) beam associated to the first SSB or the first CSI-RS to transmit data in the second DL BWP to the UE according to/in response to the first RA preamble. That is, in response to the first RA preamble, the BS transmits control signal(s) (e.g., Physical DL Control Channel (PDCCH)) and data (e.g., PDCCH) on the at least one Tx beam to the UE.

In one example, the BS performs transmission(s) on a first plurality of Tx beams in the first DL BWP, and performs transmission (s) on a second plurality of Tx beams in the second DL BWP. The first plurality of Tx beams may be the same as or different from the second plurality of Tx beams. One or more of the first plurality of Tx beams may be the same as one or more of the second plurality of Tx beams.

In one example, the BS transmits the RAR on the first DL BWP. When the BS transmits the RAR on the first DL BWP, the BS transmits the RAR on a Tx beam (e.g., narrow beam or wide beam) in the cell, wherein the Tx beam is neither associated to the first SSB and nor associated to the first CSI-RS. The Tx beam may be associated to a third SSB or a third CSI-RS transmitted in the first DL BWP.

In one example, the BS transmits the RAR on the second DL BWP. When the BS transmits the RAR on the second DL BWP, the BS transmits the RAR on a Tx beam in the second DL BWP, wherein the Tx beam is associated to (e.g., corresponding to) the first SSB or the first CSI-RS in the second DL BWP or is associated to (e.g., corresponding to) the first RA preamble.

In one example, the at least one first RACH resource includes time and/or frequency resource(s) and/or the first RA preamble. A time resource may comprise a time unit (e.g., OFDM symbol(s), mini-slot(s), slot(s) or subframe(s)). A frequency resource may comprise physical resource block(s) (PRB(s)) or subcarrier(s). In one example, the RA preamble may be a dedicated preamble configured by the at least one first RACH resource. The first RA preamble may be selected by the UE form a plurality of RA preambles configured in the first RACH configuration, configured in the first RRC message, predefined in a 3GPP specification or configured in a system information block (SIB). The SIB may be included in the first RRC message or broadcasted by the BS in the second DL BWP.

In one example, the BS transmits a PDCCH order (e.g., a DL control information (DCI)) on the second DL BWP to the UE, after (or when) transmitting the first RRC message or receiving the first RRC response message. The PDCCH order may indicate to the UE to use the first RA preamble and may trigger the UE to transmit the first RA preamble. For example, the PDCCH order includes a preamble identifier associated to (e.g., of or corresponding to) the first RA preamble.

In one example, the BS transmits the PDCCH order, the first SSB or the first CSI-RS in a time unit.

In one example, the first association configuration includes a SSB index of the first SSB or a CSI-RS index (or called identifier/identity). In one example, the first association configuration includes a CSI-RS configuration of the first CSI-RS. The CSI-RS configuration may configure the time and/or frequency resource(s) of the first CSI-RS. The CSI-RS configuration may include the CSI-RS index. The BS may transmit the CSI-RS configuration to the UE in a second RRC message before the first RRC message.

In one example, the first RACH configuration includes at least one second RACH resource and a second association configuration associating the at least one second RACH resource to a second SSB or a second CSI-RS transmitted in the second DL BWP. Then, the UE determines to use the at least one first RACH resource instead of the at least one second RACH resource, when a signal strength of the first SSB (or the first CSI-RS) measured/received by the UE is greater than a signal strength of the second SSB (or the second CSI-RS) measured/received by the UE. In one example, the first RRC message includes a second RACH configuration including the at least one second RACH resource and the second association configuration.

In one example, the UE determines to use the at least one second RACH resource instead of the at least one first RACH resource, when a signal strength of the second SSB (or the second CSI-RS) measured/received by the UE is greater than a signal strength of the first SSB (or the first CSI-RS) measured/received by the UE. In response to the determination, the UE transmits the first RA preamble or a second RA preamble in the at least one second RACH resource. In one example, the second RA preamble is associated to the at least one second RACH resource and/or the second SSB (or the second CSI-RS). In one example, the second RA preamble is selected from the plurality of RA preambles.

In one example, the PDCCH order indicates to the UE to use the second RA preamble instead of the first RA preamble and triggers the UE to transmit the second RA preamble. For example, the PDCCH order includes a preamble identifier associated to the second RA preamble.

In one example, the at least one second RACH resource includes time and/or frequency resource(s) and/or the second RA preamble for the UE to perform the RA in the first UL BWP or in the second UL BWP. A time resource may comprise a time unit (e.g., OFDM symbol(s), mini-slot(s), slot(s) or subframe(s)). A frequency resource may comprise PRB(s) or subcarrier(s). In one example, the second association configuration configures (or includes) a SSB index of the second SSB or a CSI-RS index of the second CSI-RS. In one example, the second association configuration includes a CSI-RS configuration of the second CSI-RS. The CSI-RS configuration may configure the time and/or frequency resource(s) of the second CSI-RS. The CSI-RS configuration may include the CSI-RS index. The BS may transmit the CSI-RS configuration to the UE in the second RRC message before the first RRC message.

In one example, the BS determines the first association configuration according to a first measurement result received in the first UL BWP from the UE. The first measurement result may include a signal strength of the first SSB or a signal strength of the first CSI-RS. For example, the first measurement result further includes the SSB index of the first SSB or the CSI-RS index of the first CSI-RS. In one example, the BS determines the second association configuration according to a second measurement result received in the first UL BWP from the UE. The second measurement result may include a signal strength of the second SSB or a signal strength of the second CSI-RS. For example, the second measurement result further includes the SSB index of the second SSB or the CSI-RS index of the second CSI-RS.

Figure 4:
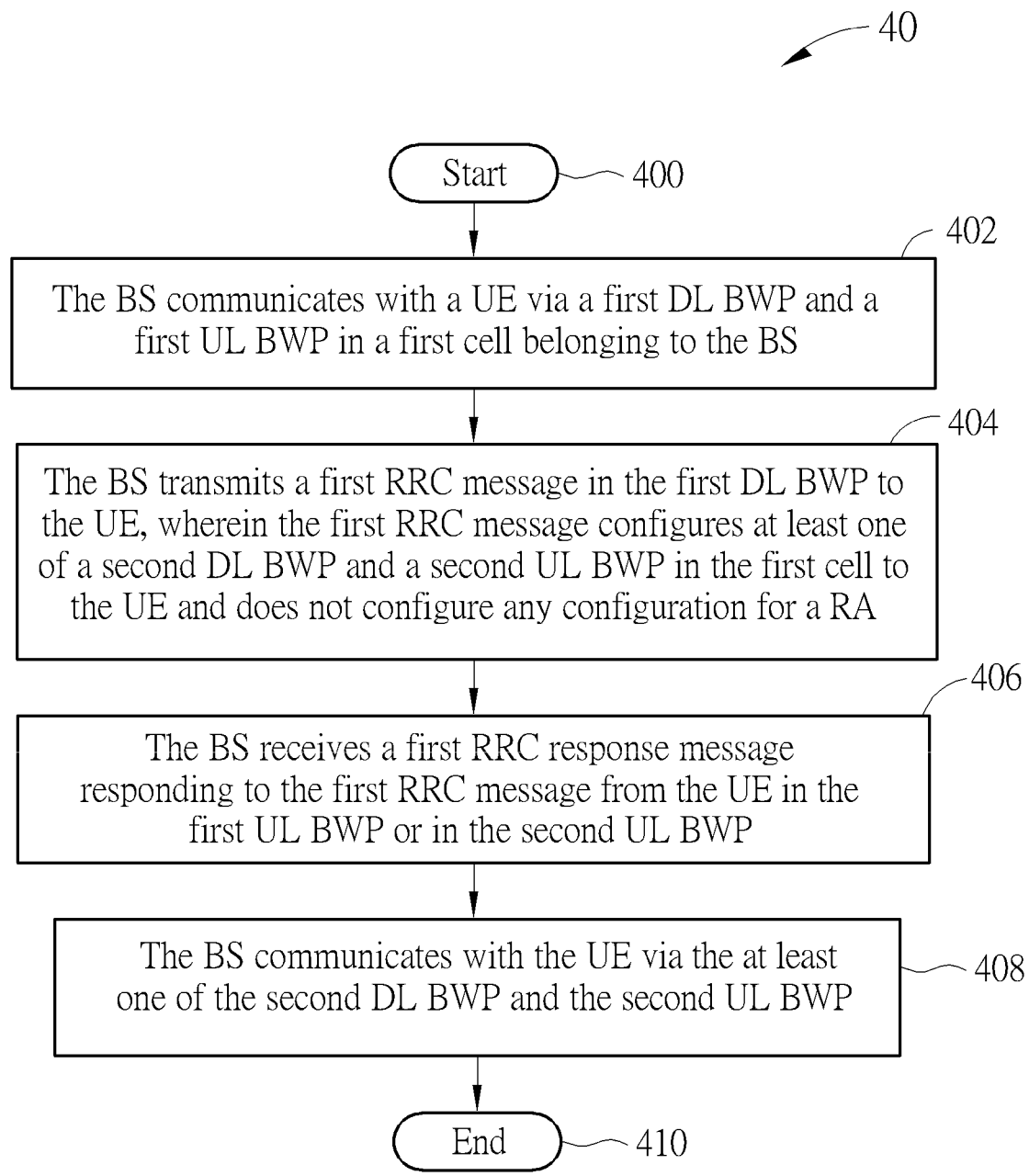
FIG. 4 is a flowchart of a process according to an example of the present invention.

A process 40 in FIG. 4 is utilized in a BS in a network shown in FIG. 1, and includes the following steps:

Step 400: Start.

Step 402: The BS communicates with a UE via a first DL BWP and a first UL BWP in a first cell belonging to the BS.

Step 404: The BS transmits a first RRC message in the first DL BWP to the UE, wherein the first RRC message configures at least one of a second DL BWP and a second UL BWP in the first cell to the UE and does not configure any configuration for a RA.

Step 406: The BS receives a first RRC response message responding to the first RRC message from the UE in the first UL BWP or in the second UL BWP.

Step 408: The BS communicates with the UE via the at least one of the second DL BWP and the second UL BWP.

Step 410: End.

According to the process 40, the BS can configure the UE to use the second DL BWP and/or the second UL BWP via the first DL BWP. The BS may receive a first indication from the UE in the first UL BWP or in the second UL BWP, wherein the first indication indicates a first SSB or a first CSI-RS received by the UE in the second DL BWP. According to the first indication, the BS knows that the UE receives the first SSB or the first CSI-RS in the second DL BWP, and transmits data to the UE in the second DL BWP on a Tx beam associated to the first SS block or the first CSI-RS. In one example, the first indication includes information associated the first SSB or the first CSI-RS, and the information includes a measurement result or a channel quality indicator (CQI) value.

In one example, the UE transmits the first indication in the first UL BWP, when the first RRC message does not configure the second UL BWP. In one example, the UE transmits the first indication in the second UL BWP, when the first RRC message configures the second UL BWP.

In one example, the BS receives a second indication from the UE in the first UL BWP or in the second UL BWP, wherein the second indication indicates a second SSB or a second CSI-RS received in a second cell by the UE. In one example, the second indication includes information associated the second SSB or the second CSI-RS, and the information includes a measurement result or a CQI value.

In one example, the first (or second) indication is transmitted on a physical UL control channel (PUCCH). In one example, the first (or second) indication is transmitted in a reference signal (RS) (e.g., a sounding RS, a demodulation signal or a specific RS). In one example, the first (or second) indication is transmitted in a physical UL shared channel (PUSCH). The PUSCH may include a Medium Access Control (MAC) Protocol Data Unit (PDU), a MAC Control Element, a Radio Link Control (RLC) PDU (e.g., a header of the RLC PDU), a PDCP PDU (e.g., a header of the PDCP PDU) and/or a RRC message.

In one example, the first indication and the second indication are in a same PUCCH message or different PUCCH messages. The first indication and the second indication may be in a same RS or different RSs. The first indication and the second indication may be in a same PUSCH or different PUSCHs.

In one example, the first RRC message configures time and/or frequency resource(s) in the first UL BWP or in the second UL BWP for the UE to transmit the first (or second) indication. Thus, the UE transmits the first (or second) indication on the time and/or frequency resource(s) to the BS. In one example, the first RRC message configures a message format for the UE to transmit the first (or second) indication in the first UL BWP or the second UL BWP. Thus, the UE transmits the first (or second) indication in the message format.

In one example, the first RRC message does not configure time and/or frequency resource(s) for the UE to transmit the first (or second) indication. Thus, the UE transmits the first (or second) indication on the time and/or frequency resource(s) in the first UL BWP to the BS. In one example, the time and/or frequency resource(s) is configured for the PUCCH (if the first (or second) indication is transmitted in the PUCCH), is configured for the RS (if the first (or second) indication is transmitted in the RS), or is configured for the PUSCH (if the first (or second) indication is transmitted in the PUSCH). In one example, the time and/or frequency resource(s) is configured by the BS in a second RRC message received before the first RRC message. In one example, the time and/or frequency resource(s) is configured by a DCI transmitted on the PDCCH in the first DL BWP.

The examples of the processes 30 may be applied to the process 40, and are not narrated herein.

Figure 5:
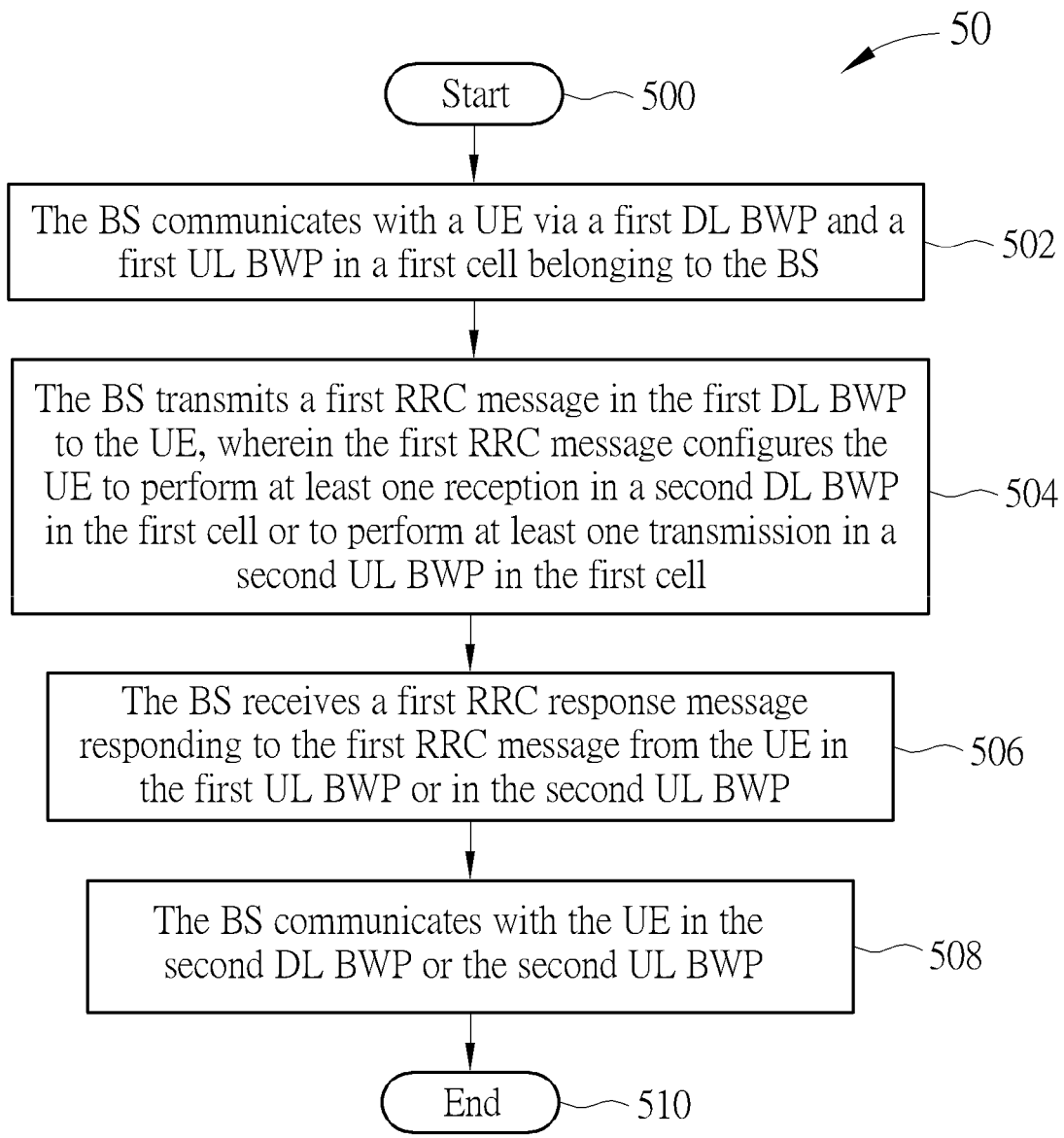
FIG. 5 is a flowchart of a process according to an example of the present invention.

A process 50 in FIG. 5 is utilized in a BS in a network shown in FIG. 1, and includes the following steps:

Step 500: Start.

Step 502: The BS communicates with a UE via a first DL BWP and a first UL BWP in a first cell belonging to the BS.

Step 504: The BS transmits a first RRC message in the first DL BWP to the UE, wherein the first RRC message configures the UE to perform at least one reception in a second DL BWP in the first cell or to perform at least one transmission in a second UL BWP in the first cell.

Step 506: The BS receives a first RRC response message responding to the first RRC message from the UE in the first UL BWP or in the second UL BWP.

Step 508: The BS communicates with the UE in the second DL BWP or the second UL BWP.

Step 510: End.

In one example, the BS receives the first RRC response message in the first UL BWP, if the first RRC message configures the second DL BWP and does not configure the second UL BWP. In one example, the BS receives the first RRC response message in the second UL BWP, if the first RRC message configures the second DL BWP and the second UL BWP.

In one example, the first RRC message does not configure any configuration for a RA. Accordingly, the UE does not perform the RA in response to the first RRC message. For example, the first RRC message does not configure any configuration for a RA for a second cell. Accordingly, the UE does not perform the RA for the second cell in response to the first RRC message.

In one example, the first RRC message comprises a first RACH configuration configuring at least one first RACH resource for the UE to perform a RA in the second UL BWP, and configures a first association configuration associating the at least one first RACH resource to a first SSB or a first CSI-RS transmitted in the second DL BWP. Accordingly, the BS receives a RA preamble from the UE in the second UL BWP according to the at least one first RACH resource, and transmits a RAR to the UE in the second DL BWP in response to the RA preamble, wherein the RAR includes a preamble identifier associated to the RA preamble.

The examples of the processes 30-40 may be applied to the process 50, and are not narrated herein. The following examples may be applied to the processes 30-50.

In one example, the UE transmits the first the RRC response message to the BS according to an UL grant in the RAR or according to an UL grant in a DCI received on a PDCCH.

In one example, the BS stops performing transmission (s) in the first DL BWP and stops performing reception(s) in the first UL BWP, in response to the first RRC message. Correspondingly, the UE may stop performing transmission(s) in the first UL BWP and stop performing reception(s) in the first DL BWP, in response to the first RRC message.

In one example, the UE communicates with the BS in the second DL BWP and the second UL BWP, when (e.g., while) communicating with the BS in the first DL BWP and the first UL BWP. In one example, the first RRC message configures the UE to stop performing transmission (s) in the first UL BWP (e.g., stop using the first UL BWP). Thus, the UE communicates with the BS in the first DL BWP and the second DL BWP for DL and in the second UL BWP for UL, in response to the first RRC message. In one example, the first RRC message configures the UE to perform reception (s) in the second DL BWP, and does not configure the UE to perform transmission(s) in the second UL BWP. Thus, the UE communicates with the BS in the first DL BWP and the second DL BWP for DL and in the first UL BWP for UL, in response to the first RRC message. In one example, the first RRC message configures the UE to perform transmission(s) in the second UL BWP, and does not configure the UE to perform reception(s) in the second DL BWP. Thus, the UE communicates with the BS in the first DL BWP for DL and in the first UL BWP and the second UL BWP for UL, in response to the first RRC message.

In one example, the UE communicates with the BS via the second DL BWP according to a configuration of the second DL BWP in the first RRC message. The UE communicates with the BS via the second UL BWP according to a configuration of the second UL BWP in the first RRC message.

In one example, the first RRC message includes the ARFCN. In one example, the first RRC message does not include the ARFCN, i.e., implying using the ARFCN configured before. In one example, the first RRC message includes a location configuration which configures at least one of a location of the second DL BWP and a location of the second UL BWP. For example, the location configuration configures a starting PRB (e.g., a starting PRB number/index) and an ending PRB (e.g., an ending PRB number/index). The location configuration may configure the starting PRB and a number of PRBs representing a bandwidth of the second UL BWP/the second DL BWP.

In one example, the first RRC message does or does not include a cell identity (e.g., physical cell identity) of the (first) cell. In one example, the first RRC message includes a PDCCH configuration configuring the time and/or frequency resource(s) for a PDCCH in the second DL BWP in (or on) which the UE searches a DCI addressed to the UE. In one example, the first RRC message does not configure a handover.

In one example, the first RRC message is an NR RRC message (e.g., NR RRC Reconfiguration message), and the first RRC response message is a NR RRC response message (e.g., NR RRC Reconfiguration Complete message). In one example, the second RRC message is an NR RRC message (e.g., NR RRC Reconfiguration message). The UE may transmit a second RRC response message to the BS on a signaling radio bearer (SRB) on the (first) cell in response to the second RRC message. The second RRC message may or may not configure a handover. When the second RRC message configures the handover, the UE may receive the second RRC message from the BS (i.e., intra-BS handover) or from another BS (i.e., inter-BS handover). When the second RRC message does not configure the handover, the UE may receive the second RRC message from the BS.

In one example, the BS transmits an activation command to the UE in the first DL BWP in response to the first RRC message (i.e., configuring the second DL BWP). The activation command is to order the UE to activate the second DL BWP and the second UL BWP (i.e., order the UE to activate communication in the second DL BWP (if configured) and the second UL BWP (if configured)). In one example, the BS transmits the PDCCH order, after transmitting the activation command. For example, the BS transmits the activation command, after (or when) transmitting the first RRC message or receiving the first RRC response message. The activation command may be a MAC control element in a MAC PDU or may be a DCI. In one example, the BS does not transmit the PDCCH order. In one example of the process 30, the UE transmits (starts to transmit) the first (or second) RA preamble, after (or when) activating the second DL BWP and the second UL BWP. In one example of the process 40, the UE transmits (starts to transmit) the first (or second) indication, after (or when) activating the second DL BWP and the second UL BWP.

In one example, the BS does not transmit the activation command. In one example, the BS does not transmit the PDCCH order. In one example of the process 30, the UE transmits the first (or second) RA preamble, after (or when) synchronizing to the second DL BWP without the PDCCH order (i.e., in response to the first RRC message instead of the PDCCH order). In one example of the process 40, the UE transmits the first (or second) indication, after (or when) synchronizing to the second cell in DL.

In one example, at least one SRB is established (or configured) for RRC messages transmitted between the UE and the BS. In one example, the UE connects to the BS (or the BS connects to the UE) by performing a RRC connection establishment procedure. In the RRC connection establishment procedure, the UE transmits a RRC Connection Request message on a SRB 0 to the BS, and receives a RRC Connection Setup message on the SRB 0 from the BS. When the UE receives the RRC Connection Setup message, the UE connects to the BS and establishes a SRB 1 with the BS. When the BS transmits the RRC Connection Setup message, receives an acknowledgement message acknowledging the RRC Connection Setup message or receives a RRC Connection Complete message responding to the RRC Connection Setup message from the UE, the BS connects to the UE and establishes the SRB 1 with the UE.

In one example, the UE connects to the other BS (or the other BS connects to the UE) and has the SRB 1 to exchange messages with the other BS. The other BS may transmit a handover command to the UE on the SRB 1 to hand over the UE to the BS. When the BS receives a handover complete message from the UE on the SRB 1, the BS connects to the UE. The handover command may include a location configuration configuring at least one of a location of the first DL BWP and a location of the first UL BWP. The location configuration may be as described for the location configuration of the second DL BWP and/or the second UL BWP.

In one example, the at least one first RACH resource and the at least one second RACH resource are different. In one example, the first SSB, the second SSB and the third SSB are different. In one example, the first CSI-RS, the second CSI-RS and the third CSI-RS are different. The first UL BWP and the first DL BWP may be a same BWP in case of TDD. The second UL BWP and the second DL BWP may be a same BWP in case of TDD.

In one example, the time and/or frequency resource (s) consists of at least one of a time resource (e.g., OFDM symbol (s), mini-slot (s), slot(s) or subframe(s)) and a frequency resource (e.g. PRB(s) or subcarrier(s)). A PRB may include a plurality of subcarriers (e.g., 12 or 24 subcarriers).

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling BWPs. Thus, the problem how a BS changes BWPs in which the BS communicates with a UE is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) for handling bandwidth parts (BWPs), comprising:
    at least one storage device; and
    at least one processing circuit, coupled to the at least one storage device, wherein the at least one storage device stores, and the at least one processing circuit is configured to execute instructions of:
    communicating with a communication device via a first downlink (DL) BWP and a first uplink (UL) BWP in a cell belonging to the BS;
    transmitting a radio resource control (RRC) message in the first DL BWP to the communication device, wherein the RRC message configures at least one of a second DL BWP and a second UL BWP in the cell to the communication device, comprises a first random access channel (RACH) configuration configuring at least one first RACH resource for the communication device to perform a random access (RA) in the first UL BWP or the second UL BWP, and configures a first association configuration associating the at least one first RACH resource to a synchronization signal block (SSB) or a channel state information reference signal (CSI-RS) transmitted in the second DL BWP;
    receiving a RRC response message responding to the RRC message from the communication device in the first UL BWP;
    receiving a RA preamble from the communication device in the first UL BWP or the second UL BWP according to the at least one first RACH resource;
    transmitting a RA response (RAR) to the communication device in the first DL BWP or the second DL BWP in response to the RA preamble; and
    communicating with the communication device via the at least one of the second DL BWP and the second UL BWP.

2. The BS of claim 1, wherein the RRC message comprises at least one of an absolute radio-frequency channel number (ARFCN) and a location configuration which configures at least one of a location of the second DL BWP and a location of the second UL BWP.

3. The BS of claim 1, wherein the instructions further comprise:
    transmitting the RAR on a transmit (Tx) beam in the second DL BWP, wherein the Tx beam is associated to the SSB or the CSI-RS in the second DL BWP or is associated to the RA preamble.

4. The BS of claim 1, wherein the instructions further comprise:
    transmitting a Physical DL Control Channel (PDCCH) order in the second DL BWP to the communication device, after transmitting the RRC message or receiving the RRC response message.

5. The BS of claim 1, wherein the RRC message comprises a second RACH configuration comprising at least one second RACH resource and a second association configuration.

6. A base station (BS) for handling bandwidth parts (BWPs), comprising:
at least one storage device; and
at least one processing circuit, coupled to the at least one storage device, wherein the at least one storage device stores, and the at least one processing circuit is configured to execute instructions of:
communicating with a communication device via a first downlink (DL) BWP and a first uplink (UL) BWP in a first cell belonging to the BS;
transmitting a radio resource control (RRC) message in the first DL BWP to the communication device, wherein the RRC message configures at least one of a second DL BWP and a second UL BWP in the first cell to the communication device and does not configure any configuration for a random access (RA);
receiving a RRC response message responding to the RRC message from the communication device in the first UL BWP or in the second UL BWP; and
communicating with the communication device via the at least one of the second DL BWP and the second UL BWP.

7. The BS of claim 6, wherein the instructions further comprise:
receiving a first indication from the communication device in the first UL BWP or in the second UL BWP, wherein the first indication indicates a first synchronization signal block (SSB) or a first channel state information reference signal (CSI-RS) received by the communication device in the second DL BWP; and
transmitting data to the communication device in the second DL BWP on a transmit (Tx) beam associated to the first SSB or the first CSI-RS.

8. The BS of claim 6, wherein the instructions further comprise:
receiving a second indication from the communication device in the first UL BWP or in the second UL BWP, wherein the second indication indicates a second SSB or a second CSI-RS received in a second cell by the communication device.

9. The BS of claim 6, wherein the RRC message configures at least one of a time resource and a frequency resource in the first UL BWP or in the second UL BWP for the communication device to transmit a first indication.

10. A base station (BS) for handling bandwidth parts (BWPs), comprising:
at least one storage device; and
at least one processing circuit, coupled to the at least one storage device, wherein the at least one storage device stores, and the at least one processing circuit is configured to execute instructions of:
communicating with a communication device via a first downlink (DL) BWP and a first uplink (UL) BWP in a cell belonging to the BS;
transmitting a radio resource control (RRC) message in the first DL BWP to the communication device, wherein the RRC message configures the communication device to perform at least one reception in a second DL BWP in the cell or to perform at least one transmission in a second UL BWP in the cell;
receiving a RRC response message responding to the RRC message from the communication device in the first UL BWP or in the second UL BWP; and
communicating with the communication device in the second DL BWP or the second UL BWP; and
transmitting a Physical DL Control Channel (PDCCH) order in the second DL BWP to the communication device, after transmitting the RRC message or receiving the RRC response message.

11. The BS of claim 10, wherein the first DL BWP, the first UL BWP, the second DL BWP and the second UL BWP belong to the cell or a carrier identified by an absolute radio-frequency channel number (ARFCN).

12. The BS of claim 10, wherein the RRC message comprises at least one of an ARFCN and a location configuration which configures at least one of a location of the second DL BWP and a location of the second UL BWP.

* * * * *